US011177961B2

(12) United States Patent
Andreina et al.

(10) Patent No.: US 11,177,961 B2
(45) Date of Patent: Nov. 16, 2021

(54) METHOD AND SYSTEM FOR SECURELY SHARING VALIDATION INFORMATION USING BLOCKCHAIN TECHNOLOGY

(71) Applicant: NEC Laboratories Europe GmbH, Heidelberg (DE)

(72) Inventors: Sebastien Andreina, Meyrin (CH); Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 691 days.

(21) Appl. No.: 16/142,028

(22) Filed: Sep. 26, 2018

(65) Prior Publication Data
US 2019/0182047 A1   Jun. 13, 2019

Related U.S. Application Data

(60) Provisional application No. 62/595,634, filed on Dec. 7, 2017.

(51) Int. Cl.
*H04L 9/32* (2006.01)
*G06F 21/64* (2013.01)
(Continued)

(52) U.S. Cl.
CPC ........ *H04L 9/3236* (2013.01); *G06F 21/6281* (2013.01); *G06F 21/64* (2013.01);
(Continued)

(58) Field of Classification Search
CPC ..... H04L 9/3236; H04L 9/30; H04L 63/0428; G06F 21/64
(Continued)

(56) References Cited

U.S. PATENT DOCUMENTS

| 6,189,098 B1 * | 2/2001 | Kaliski, Jr. | ............. G06F 21/33 713/168 |
| 9,705,730 B1 * | 7/2017 | Petri | ..................... G06F 16/162 |

(Continued)

FOREIGN PATENT DOCUMENTS

EP   3285248 A1   2/2018

OTHER PUBLICATIONS

Zamani, Mahdi, et al., RapidChain: Scaling Blockchain via Full Sharding, Proceedings of the 2018 ACM SIGSAC Conference on computer and communications security, p. 931-948 (Year: 2018).*

(Continued)

*Primary Examiner* — Jung W Kim
*Assistant Examiner* — Angela R Holmes
(74) *Attorney, Agent, or Firm* — Leydig, Voit & Mayer, Ltd.

(57) ABSTRACT

A method for securely sharing validation information of one or more data files stored on different cloud servers using distributed ledger technology includes requesting access to the data files and calculating a hash thereof. A structured Merkle tree is constructed using the hash and additional hashes of other data files for which a user has not granted access, but has used to construct a corresponding Merkle tree for which the user has committed a root value to a main blockchain. It is checked whether the root value of the Merkle tree is the same as the one the user has committed, and whether the hash of the data files is stored in a block of a satellite blockchain linked to the main blockchain and operated by a subset of nodes of the main blockchain that trust one another.

20 Claims, 10 Drawing Sheets

(51) Int. Cl.
  *G06F 21/62* (2013.01)
  *H04L 9/30* (2006.01)
  *H04L 29/06* (2006.01)
  *G06Q 30/06* (2012.01)
  *G06Q 10/10* (2012.01)

(52) U.S. Cl.
  CPC ............ *H04L 9/30* (2013.01); *H04L 63/0428* (2013.01); *G06F 2221/2141* (2013.01); *G06Q 10/10* (2013.01); *G06Q 30/0609* (2013.01); *H04L 2209/38* (2013.01); *H04L 2209/56* (2013.01)

(58) Field of Classification Search
  USPC .......................................................... 713/168
  See application file for complete search history.

(56) References Cited

U.S. PATENT DOCUMENTS

| | | | | |
|---|---|---|---|---|
| 10,749,681 | B2* | 8/2020 | Andrade | H04L 9/0866 |
| 2010/0268966 | A1* | 10/2010 | Leggette | G06F 11/1076 |
| | | | | 713/193 |
| 2011/0022642 | A1* | 1/2011 | deMilo | G06F 21/602 |
| | | | | 707/805 |
| 2014/0143543 | A1* | 5/2014 | Aikas | G06F 21/6209 |
| | | | | 713/168 |
| 2014/0282863 | A1* | 9/2014 | Buldas | H04L 9/3265 |
| | | | | 726/2 |
| 2015/0363770 | A1* | 12/2015 | Ronca | G06Q 20/10 |
| | | | | 705/66 |
| 2016/0098730 | A1* | 4/2016 | Feeney | G06Q 20/3825 |
| | | | | 705/71 |
| 2016/0110261 | A1* | 4/2016 | Parab | G06F 11/1453 |
| | | | | 707/692 |
| 2016/0191243 | A1* | 6/2016 | Manning | H04L 9/321 |
| | | | | 713/168 |
| 2016/0330034 | A1* | 11/2016 | Back | H04L 9/3255 |
| 2017/0005804 | A1* | 1/2017 | Zinder | G06F 21/6254 |
| 2017/0111175 | A1* | 4/2017 | Oberhauser | H04L 63/08 |
| 2017/0132625 | A1* | 5/2017 | Kennedy | G06F 16/2379 |
| 2017/0236120 | A1* | 8/2017 | Herlihy | G06F 21/57 |
| | | | | 705/67 |
| 2017/0243176 | A1* | 8/2017 | Hanke | G06Q 20/3827 |
| 2017/0289111 | A1* | 10/2017 | Voell | H04L 9/3236 |
| 2017/0364698 | A1* | 12/2017 | Goldfarb | G06F 16/9024 |
| 2018/0101844 | A1* | 4/2018 | Song | H04L 9/3265 |
| 2018/0152442 | A1* | 5/2018 | Buldas | G06F 21/64 |

OTHER PUBLICATIONS

Shetty, Sachin, "Data Provenance Assurance In Cloud Using Blockchain", Virginia Modeling Analysis and Simulation Center, Old Dominion University, Norfolk, VA (Year: 2017).*

Chris Ferris, "Hyperledger Fabric v1.0 Released", Hyperledger Fabric, The Linux Foundation Projects, pp. 1-2, Nov. 30, 2017.

"Video: Hyperledger, a Greenhouse Incubator for Blockchain Projects", Hyperledger Indy, pp. 1-31, Nov. 6, 2017.

"The Platform for Distributed Applications", Swirlds, pp. 1-6, Nov. 30, 2017.

Ghassan O. Karame, et al., "Securing Cloud Data in the New Attacker Model", pp. 1-19, Dec. 2014.

Wenting Li, et al., "Towards Scalable and Private Industrial Blockchains", BCC '17 Proceedings of the ACM Workshop on Blockchain, Cryptocurrencies and Contracts, pp. 9-14, Apr. 2, 2017.

"Thomson Reuters 2016 Know Your Customer Surveys Reveal Escalating Costs and Complexity: Parallel surveys show differing perspectives of financial institutions and their corporate customers on the effect of financial firms' spend of up to $500 million annually on KYC globally", May 9, 2016, pp. 1-4.

Hubert Ritzdorf et al: "Towards Shared Ownership in the Cloud", International Association for Cryptologic Research, vol. 20170309:102132, Mar. 9, 2017 (Mar. 9, 2017), pp. 1-4, XP061022945.

Jason K Resch Development Cleversafe et al: "AONT.RS: Blending Security and Performance in Dispersed Storage Systems", USENIX, Dec. 17, 2010 (Dec. 17, 2010), pp. 1-12, XP061009899.

Ghassan O Karame et al: "Securing Cloud Data in the New Attacker Model", International Association for Cryptologic Research, vol. 20140718:123221, Jul. 16, 2014 (Jul. 16, 2014), pp. 1-9, XP061016652.

* cited by examiner

Algorithm 1 Bastion: Encryption

Input: $k$: Key, $x[1], ..., x[m]$ blocks of plain text file (m has to be odd)
Output: $c[1], ..., c[m+1]$ $m+1$ blocks of cipher text
1: $y[m+1] \xleftarrow{U} \{0,1\}^l$   ▷ $l$ is the block size of the block cipher and $y[m+1]$ is its IV
2: for $i = 1...m$ do
3:   $y[i] \leftarrow x[i] \oplus AES.Enc_k(y[m+1]+i)$
4: end for
5: $t \leftarrow y[1]$
6: for $i = 2...m+1$ do
7:   $t \leftarrow t \oplus y[i]$
8: end for
9: for $i = 1...m+1$ do
10:   $c[i] \leftarrow t \oplus y[i]$
11: end for
12: return $c$   ▷ $c = c[1]...c[m+1]$

FIG. 4

Algorithm 2 Bastion: Decryption

Input: $k$: Key, $c[1], ..., c[m+1]$
Output: $x[1], ..., x[m]$
1: $t \leftarrow c[m+1]$
2: for $i = 1...m$ do
3:     $t \leftarrow t \oplus c[i]$
4: end for
5: for $i = 1...m+1$ do
6:     $y[i] \leftarrow t \oplus c[i]$
7: end for
8: for $i = 1...m$ do
9:     $x[i] \leftarrow y[i] \oplus AES.Dec_k(y[m+1]+i)$
10: end for
11: return $x$      $\triangleright$ $x = x[1]...x[m]$

FIG. 5

Algorithm 3 Data structure used

1: Struct *Customer* contains
   - *ID*      type    string
   - *Pk*      type    []byte
   - *HashMerkle*     type    [32]byte end 2: Struct *Company* contains
   - *ID*      type    string
   - *Name*      type    string
   - *URL*      type    string
   - *Endpoint_Contact*    type    string
   - *Web_Cert*      type    string or []byte
   - *Pk*      type    []byte end

FIG. 6

Algorithm 4 Upload files

Input: *clouds*: a list of at least two cloud services, *files*: a list of randomized files.

1: if *length(clouds)* < 2 then
2:     return "Error, not enough cloud services"
3: end if
4: foreach *file* in *files* do
5:     $key \xleftarrow{U} \{0,1\}^k$     ▷ Where $k$ is the key security parameter
6:     *fileBlocks* ← *nil*
7:     while *file.HasMoreBits()* do
8:         *fileBlocks* ← *Append(fileBlocks, file.ReadBits(128))*
9:         ▷ We use 128 bits block as the we use AES with bastion.
10:     end while
11:     while *length(fileBlocks)* ≤ 2 · *length(clouds)* do
12:         *fileBlocks* ← *Append(fileBlocks, new [16]byte)*
13:         ▷ We add blank padding to have enough blocks.
14:     end while
15:     if *length(fileBlocks)*%2 == 0 then
16:         *fileBlocks* ← *Append(fileBlocks, new [16]byte)*
17:     end if
18:     *Blocks* ← *Bastion.encrypt(fileBlocks, key)*
19:     *Blocks* ← *Append(Blocks, key)*
20:     $n \leftarrow \left\lfloor \frac{length(Blocks)}{length(clouds)} \right\rfloor$
21:     $r \leftarrow length(Blocks) - n \cdot length(clouds)$
22:     foreach *cloud* in *clouds* do
23:         *to_upload* ← (r > 0) ? *Blocks.pop(n + 1)* : *Blocks.pop(n)*
24:         $r \leftarrow r - 1$
25:         *cloud.upload(file.ID, to_upload)*
26:     end for
27: end for
28: return "Success"

FIG. 7

Algorithm 5 Download file

Input: *clouds*: the list of all the cloud services used, *id*: the id of the file.
Output: a decrypted file
1: if $length(clouds) < 2$ then
2:  return "Error, not enough cloud services"
3: end if
4: $Blocks \leftarrow nil$
5: foreach *cloud* in *clouds* do
6:  $Blocks \leftarrow Append(Blocks, cloud.download(id))$
7: end for
8: $key \leftarrow Blocks.GetLastElement()$
9: $blocks \leftarrow Blocks.removeLastElement()$
10: $file \leftarrow Bastion.decrypt(Blocks, key)$
11: return *file*

FIG. 8

```
Algorithm 6 Chaincode
  Global variable: map                                          ▷ map is the key-value store
 1: function add_company(comp type Company, sign type []byte)
 2:     if !verifySignature(sign, comp) then
 3:         return "Error, invalid signature"
 4:     end if
 5:     if !verify(comp) then
 6:         return "Error, company information invalid"
 7:     end if
 8:     key ← "company"||comp.ID
 9:     if map.Contains(key) then
10:         return "Error, company already exists"
11:     end if
12:     map.Set(key, comp)
13:     return "Success"
14: end function
15:
16: function add_customer(customer type Customer, sign type []byte)
17:     if !verify(sign, customer) then
18:         return "Error, invalid signature"
19:     end if
20:     if !verify(customer) then
21:         return "Error, customer information invalid"
22:     end if
23:     key ← "customer"||customer.ID
24:     if map.Contains(key) then
25:         return "Error, user already exists"
26:     end if
27:     map.Set(key, customer)
28:     return "Success"
29: end function
30:
```

FIG. 9A

```
31: function update_files(customerID type string, newHash type [32]byte, sign type []byte)
32:     key ← "customer"||customer.ID
33:     customer ← map.get(key)
34:     if !verify(sign, customer, newHash) then
35:         return "Error, invalid signature"
36:     end if
37:     customer.HashMerkle ← newHash
38:     map.Set(key, customer)
39:     return "Success"
40: end function
41:
42: function get_all_customers()
43:     return map.GetAllStartingWith("customer-")
44: end function
45:
46: function get_all_companies()
47:     return map.GetAllStartingWith("company-")
48: end function
49:
50: function get_customer_details(customerID type string)
51:     key ← "customer"||customer.ID
52:     if !map.Contains(key) then
53:         return "Error, invalid customer ID"
54:     end if
55:     return map.Get(key)
56: end function
57:
58: function get_company_details(companyID type string)
59:     key ← "company"||customer.ID
60:     if !map.Contains(key) then
61:         return "Error, invalid company ID"
62:     end if
63:     return map.Get(key)
64: end function
```

FIG. 9B

METHOD AND SYSTEM FOR SECURELY SHARING VALIDATION INFORMATION USING BLOCKCHAIN TECHNOLOGY

CROSS-REFERENCE TO PRIOR APPLICATION

Priority is claimed to U.S. Patent Application No. 62/595,634, filed on Dec. 7, 2017, the entire disclosure of which is hereby incorporated by reference herein.

FIELD

The present invention relates to a method and system for securely sharing validation information using blockchain technology and is particularly applicable to Know Your Customer (KYC) process for validating the identity of customers (also referred to herein as users). This is a security verification process which is required for many different institutions in order to securely provide goods or services to customers having a valid identity. Embodiments of the present invention also relate to enhancing data privacy for documents (also referred to herein as data files) which are stored on multiple cloud servers and for which validation information can be shared according to embodiments of the present invention.

BACKGROUND

KYC processes are means of providing customer identity validation. Many services, especially financial services, require a KYC process as a preliminary step. However, the inventors have recognized that independent services without data sharing results in repeated KYC processes, which is a significant source of high costs incurred by the companies. According to an article "Know Your Customer Surveys Reveal Escalating Costs and Complexity", Thomson Reuters, May 9, 2016, banks are spending between $60 million and $500 million in this process and the cost keeps increasing every year. In addition to the extra cost, the current process also has a negative impact on the user experience. In fact, according to the same survey, 89% of the customers were not satisfied with the process, and even 13% decided to change their financial institution due to their experience. Accordingly, the inventors have recognized that KYC processes can be inefficient as companies do not share their validation information, and documents have to be validated regardless of whether they had already been validated by another company. Moreover, the inventors have recognized that the existing KYC processes are vulnerable to security attacks.

SUMMARY

In an embodiment, the present invention provides a method for securely sharing validation information of one or more data files stored on different cloud servers using distributed ledger technology. The method includes requesting access to the data files stored on the cloud servers and calculating a hash of the data files. A structured Merkle tree is constructed using the hash of the data files and additional hashes received from a user, the additional hashes being hashes of other data files for which the user has not granted access, but has used to construct a corresponding Merkle tree for which the user has committed a root value to a main blockchain to which the user has registered. It is checked whether the root value of the constructed Merkle tree is the same as the one the user has committed to the main blockchain. It is checked whether the hash of the data files is stored in a block of a satellite blockchain linked to the main blockchain and operated by a subset of nodes of the main blockchain that trust one another.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 is a first algorithm for Bastion encryption;

FIG. 5 is a second algorithm for Bastion decryption;

FIG. 6 is a third algorithm for a data structure used;

FIG. 7 is a fourth algorithm for uploading files;

FIG. 8 is a fifth algorithm for downloading files;

FIG. 9A is a first part of a sixth algorithm for an embodiment of chaincode; and FIG. 9B is a second part of the sixth algorithm starting from line 31.

DETAILED DESCRIPTION

Figure 1:
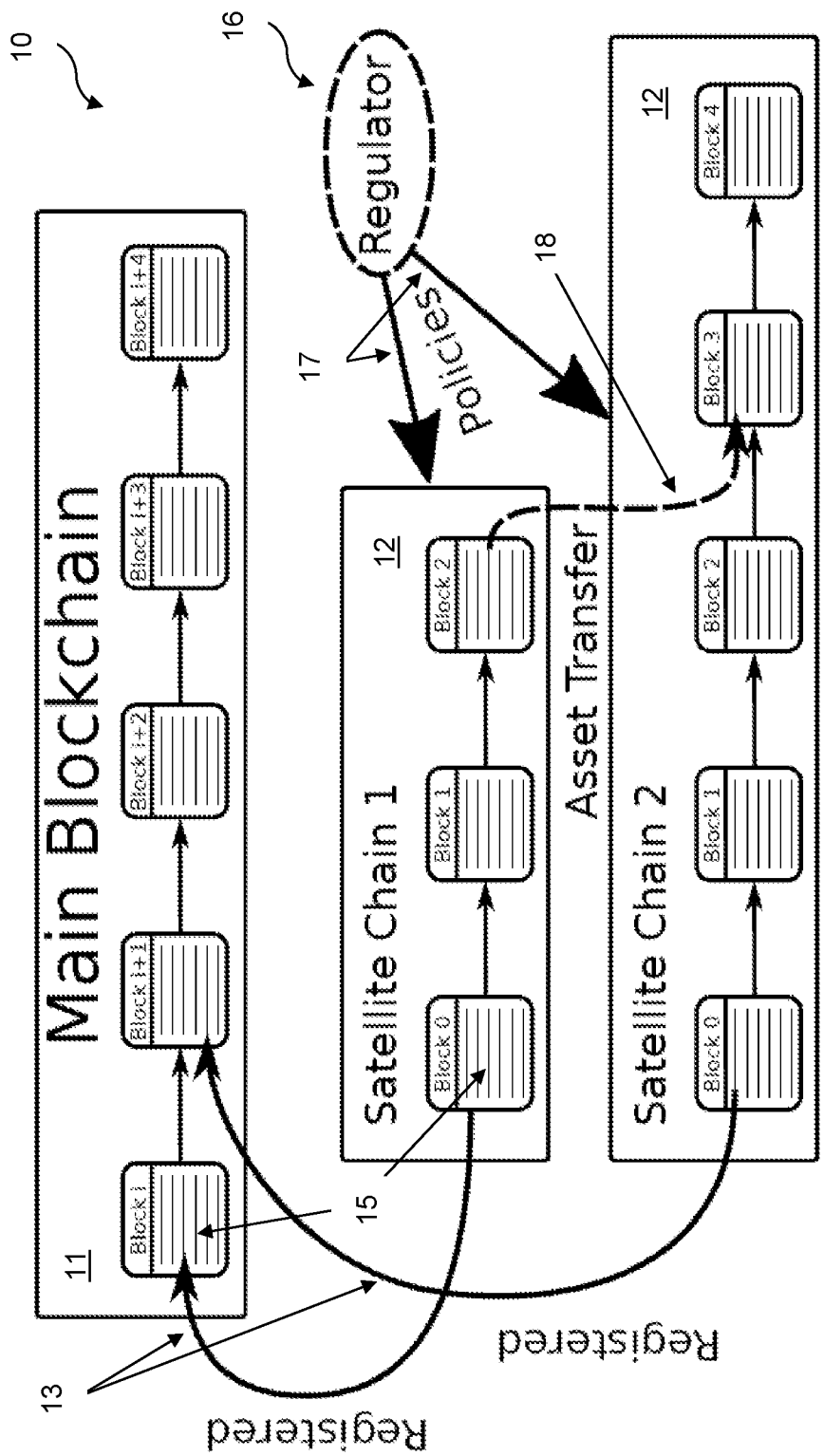
FIG. 1 is a schematic overview of a regulator and an example of a blockchain with two satellite chains.

Embodiments of the present invention provide solutions through technical means of blockchain technology to provide for securely sharing validation information and, in particular, for ensuring that documents have been validated while also ensuring the privacy of those data files. In particular, by the special implementation of a permissioned blockchain that allows companies to share their validations of documents, the efficiency of validation processes, such as the KYC processes, can be greatly improved, thereby resulting in huge savings not only in terms of cost, but also required time and resources previously necessary to perform the validation processes. Moreover, the data privacy is maintained and equivocation can be prevented despite the documents being shared among different cloud services.

A protocol used in embodiments of the present invention simplifies and automatizes the KYC process or other process using document validation in a manner which allows companies, for the first time, to be able to securely rely on the verifications of other companies. Embodiments of the present invention therefore allow the sharing of a document's validation in a secure way while preserving the privacy of the customers. Thus, not only are embodiments of the present invention able to avoid repetition of KYC processes, they do so in a manner which enhances security against attacks and increases data privacy.

According to an embodiment, customers upload their files on cloud services. When interacting with a company, the customer can then directly grant access to the files through an Access Control List (ACL) provided by the cloud services. In order to prevent equivocation and achieve strong consistency on data, customers can be required to provide a commitment of their data, preferably as hash of the data files, which is stored on a blockchain. The protocol provides privacy to the customers against curious cloud providers without any key management using all or nothing encryption (AONE). As companies do not trust every other company, companies can be required to enter alliances. The validation can then only be shared between members of a same alliance.

Embodiments of the present invention simplify the KYC process by sharing the customer identity validation results through blockchains. A permissioned blockchain that allows the deployment of chaincodes (or smart contracts) is used for the protocol.

Embodiments of the present invention provide for:
1. Combining cloud-based AONE with blockchain smart contracts such that ACL rights can be handled in the Cloud.
2. Committing a randomized Merkle root in the blockchain to enhance security against privacy attacks.
3. Utilizing the handling of ACL rights in the cloud together with the committed randomized Merkle root to provide for more efficient KYC processes.

In an embodiment, the present invention provides a method for securely sharing validation information of one or more data files stored on different cloud servers using distributed ledger technology, the method comprising:
a) requesting access to the data files stored on the cloud servers;
b) calculating a hash of the data files;
c) constructing a structured Merkle tree using the hash of the data files and additional hashes received from a user, the additional hashes being hashes of other data files for which the user has not granted access, but has used to construct a corresponding Merkle tree for which the user has committed a root value to a main blockchain to which the user has registered;
d) checking whether the root value of the Merkle tree constructed in step c) is the same as the one the user has committed to the main blockchain; and
e) checking whether the hash of the data files is stored in a block of a satellite blockchain linked to the main blockchain and operated by a subset of nodes of the main blockchain that trust one another.

Advantageously, the data files can have an all or nothing encryption.

In some embodiments, the data files are requested by a company registered to the blockchains to secure a Know Your Customer (KYC) process in response to a request from the user to enter into a contract with the company, and the method further comprises issuing the contract.

In some embodiments, the request to access the data files triggers a request from the user to different cloud service providers of the cloud servers to modify an Access Control List (ACL).

Advantageously, based on a determination in step e) that the hash of the data files is already stored in the satellite blockchain, the data files can be validated without undergoing any other validation process. Further advantageously, the method can further comprise issuing a transaction in a new block on the satellite blockchain including the hash of the data files indicating that a shared validation has been used.

In some embodiments, the method further comprises, based on a determination in step e) that the hash of the data files is not already stored in the satellite blockchain:
determining whether the hash of the data files is stored in a different satellite chain linked to the main blockchain; and
requesting an asset transfer transaction from the different satellite chain to validate the data files.

In some embodiments, the method further comprises, based on a determination in step e) that the hash of the data files is not already stored in the satellite blockchain:
performing a separate validation process; and then
issuing a transaction in a new block on the satellite blockchain including the hash of the data files.

In some embodiments, in response to step a), uniform resource locators (URLs) to blocks of the data files on the cloud servers are received and used to download the data files for performing step b). Advantageously, a public key of the user stored on the main blockchain can be provided and used for calculating the hash of the data files in step b).

In another embodiment, the present invention provides a computer system for validating data files stored on different cloud servers using distributed ledger technology, the system comprising one or more computational processors with access to memory, which, alone or in combination, are configured to provide for execution of the following steps:
a) requesting access to the data files stored on the cloud servers;
b) calculating a hash of the data files;
c) constructing a structured Merkle tree using the hash of the data files and additional hashes received from a user, the additional hashes being hashes of other data files for which the user has not granted access, but has used to construct a corresponding Merkle tree for which the user has committed a root value to a main blockchain to which the user has registered;
d) checking whether the root value of the Merkle tree constructed in step c) is the same as the one the user has committed to the main blockchain; and
e) checking whether the hash of the data files is stored in a block of a satellite blockchain linked to the main blockchain and operated by a subset of nodes of the main blockchain that trust one another.

Advantageously, the data files can have an all or nothing encryption.

In some embodiments, the data files are requested by a company registered to the blockchain to secure a Know Your Customer (KYC) process in response to a request from the user to enter into a contract with the company.

In some embodiments, based on a determination in step e) that the hash of the data files is already stored in the satellite blockchain, the computer system is configured to provide a notification that the data files have been validated without a need to perform any other validation process.

In another embodiment, the present invention provides a non-transitory, tangible computer-readable medium having instructions thereon which, upon execution on one or more processors, provide for execution of the following steps:
a) requesting access to the data files stored on the cloud servers;
b) calculating a hash of the data files;
c) constructing a structured Merkle tree using the hash of the data files and additional hashes received from a user, the additional hashes being hashes of other data files for which the user has not granted access, but has used to construct a corresponding Merkle tree for which the user has committed a root value to a main blockchain to which the user has registered;
d) checking whether the root value of the Merkle tree constructed in step c) is the same as the one the user has committed to the main blockchain; and
e) checking whether the hash of the data files is stored in a block of a satellite blockchain linked to the main blockchain and operated by a subset of nodes of the main blockchain that trust one another A blockchain is a distributed ledger technology based on a peer-to-peer network. Transactions are broadcast in the network for every node to verify. Most existing blockchains leverage consensus protocols allowing nodes to collaboratively maintain a common ledger of validated transactions.

In an exemplary embodiment described herein, the blockchain which is used is based on Hyperledger fabric, which is an open source permissioned blockchain mainly developed by the company IBM and managed by the LINUX FOUNDATION. A permissioned blockchain is a blockchain that is not publicly available, but users have to request and acquire an enrollment certificate before attempting to connect to the network and submit transactions. Hyperledger fabric provides the capability to deploy chaincodes. Chaincodes are softwares that are running on the blockchain and can provide an application programming interface (API) to interact with the blockchain. Hyperledger fabric supports Turing complete chaincodes, meaning that it is possible to build any protocol on top of Hyperledger fabric.

The blockchain of the company NEC addresses some of the shortcomings of Hyperledger fabric, such as the lack of performances and privacy. Indeed, NEC's blockchain includes the fastest Byzantine Fault Tolerant (BFT) protocol to date for its consensus layer. It also allows the creation of satellite chains as discussed in Li, W., Sforzin, A., Fedorov, S., Karame, G. O., "Towards scalable and private industrial blockchains," In: Proceedings of the ACM Workshop on Blockchain, Cryptocurrencies and Contracts, BCC '17, ACM, New York, N.Y., USA, pp. 9-14 (2017), the entire contents of which is hereby incorporated herein by reference.

An example of a distributed ledger system 10 having a main blockchain 11 and two satellite chains 12, each having transactions contained in blocks 15, is shown in FIG. 1. Satellite chains 12 are secondary blockchains linked to the main blockchain 11. The number of satellite chains 12 is not limited. The link between each satellite chain 12 and the main blockchain 11 is a registration 13, meaning the main blockchain 11 only keeps track of all the satellite chains 12 of the system. The satellite chains 12 contain different blocks than the main blockchain 11. A satellite chain 12 typically comprises only a subset of the nodes of the main blockchain 11. The nodes are computer devices (e.g., servers) that keep a local copy of the blockchain in memory and validate new blocks 15. Transactions contained in the blocks 15 on a satellite chain 12 are only visible to the subset of nodes that are included in the satellite chain 12. It is possible to add a regulator 16 to the satellite chains 12. The regulator 16 can enforce policies 17 on each satellite chain 12. The regulator 16 is represented by a chaincode that is automatically deployed on every satellite chain 12, ensuring that as long as a majority (here 2f+1 nodes out of 3f+1) are honest, the regulation is enforced. It is also possible to transfer assets among different satellite chains by an asset transfer transaction 18 at any point without compromising the security and soundness guarantee of the system 10. In the example where two satellite chains 12 are deployed as shown in FIG. 1, the asset transfer transaction 18 can take place from satellite chain 1 to satellite chain 2, and therefore between nodes which are part of at least one of those satellite chains. An asset can be any possible transaction, from a digital currency to a full document. Each satellite chain 12 runs its own consensus layer, and the satellite chains 12 can even use different consensus algorithms.

Bastion, which is proposed by Karame, G., Soriente, C., Lichota, K., Capkun, S., "Securing cloud data in the new attacker model," IACR Cryptology ePrint Archive (2014), which is hereby incorporated by reference herein in its entirety, is an AONE protocol. AONEs are block encryption protocols that provide the following property: if an attacker recovers the encryption key and only (n−λ) blocks out of n, then the attacker will not be able to extract any information about the plain text, λ being a security parameter (typically equal to 1 or 2). Bastion is an efficient AONE with a λ equal to 2.

Using Bastion, as long as an attacker cannot recover the secret key and more than (n−2) blocks, the attacker will not be able to infer any information on the plain data. Bastion's encryption and decryption algorithms are shown in Algorithm 1 and Algorithm 2 in FIGS. 4 and 5, respectively.

A BFT storage is a storage solution that achieves strong consistency and high availability. BFT protocols are usually resistant to fbyzantine nodes, if the total number of nodes is n, n≥3·f+1, even if some protocols can reduce n to n≥2·f+1.

Strong consistency on data means that, if a user U1 reads a file with last version number vi at time t1 then no other users $U_n$ reading at time t2, t2≥t1 will read that the last version of the file is v with v<vi. Also, two users reading the same file with the same version number will always read exactly the same content.

BFT storages are protocols that are very costly, as they typically require each file to be replicated in every node, creating a huge overhead for data storage. BFT storage also provides poor performances compared to crash fault tolerant protocols.

NEC developed a way to achieve BFT storage using a BFT blockchain and a crash-fault tolerant storage, achieving strong consistency on the data while keeping the performance of a crash-fault tolerant protocol. This result is achieved by requiring the commitment (the hash) of the file to be stored on the blockchain. Then, any update to the file should also be reflected on the blockchain to be accepted. As the blockchain achieves strong consistency and high availability, the commitment is always available to the readers and is the same for all the readers, allowing them to verify the files they read instead of trusting the crash fault tolerant storage service.

Hyperledger Indy is an open source identity blockchain, that provides self-sovereign identity for everyone. Hyperledger Indy could also help to reduce the cost of KYC by providing provable claims. The main purpose of Hyperledger Indy is to provide an identity with provable claims issued by other parties in the blockchain. Hyperledger Indy has a few shortcomings, such as the incapacity to use a claim that has been provided by someone not on the blockchain, or the lack of support of chaincode, preventing protocols to be customized. Hyperledger Indy is also only under development compared to Hyperledger fabric or NEC's blockchain that are ready for production. As Hyperledger Indy does not provide satellite chains, transactions of a company alliance would have to be done off the ledger in order to achieve privacy.

Swirlds is a private blockchain owned by the company SWIRLDS INC. Swirlds supports smart contracts, similar to Hyperledger fabric's chaincode. NEC's blockchain could thus be replaced by Swirlds's blockchain. But, as for Hyperledger Indy, Swirlds's has some shortcomings compared to NEC's blockchain such as the lack of satellite chains that allow NEC's blockchain to provide a fine grain tunable level of privacy.

Embodiments of the present invention advantageously decrease the cost of the validation of the identity of customers by companies. This process is each year more expensive and costs banks up to half a billion of dollars per year. Embodiments of the present invention achieve a validation sharing management protocol between companies that do not trust each other in order to reduce the cost of the KYC process and improve the computer systems implementing the protocol by significantly reducing overall the amount of computing resources and memory required.

The protocol allows the sharing of validation information between companies that trust each other, while preserving the privacy of the customers. Embodiments of the present invention can thus reduce the number of times each document is verified, as verifications can be shared, and would thus increase the efficiency and reduce the cost of the KYC process, also in terms of computational complexity and computational resources.

According to an embodiment, the protocol is mainly based on company alliances, such as the MILES & MORE alliance that regroups 38 airlines companies and more than 200 other companies such as car rental, hotels, etc. Companies in such alliances will formalize the validation process of identity documents and will then trust each other to apply it correctly. According to an embodiment, trust can be a requirement that a company claiming the validation of a document can be held accountable or liable for the verification.

According to an embodiment, it is assumed that customers in the protocol are rational and are only interested in increasing their advantage in the system, either by gaining information on other customers, or by trying to equivocate information to companies. It is also assumed that companies are honest, but curious and are only interested in new business clients or gaining some advantage knowledge about other clients or companies. Companies are assumed to act honestly with respect to their alliance. Cloud service providers such as AMAZON AWS, MICROSOFT AZURE or GOOGLE are also assumed honest, but also curious. According to an embodiment, it is required that those clouds provide the possibility to define an ACL for each file stored, and each cloud should enforce its different ACLs honestly, but the cloud services are assumed to be curious about the files their users store. It is also further assumed that all participants are computationally bounded and cannot break the signature schemes or commitment schemes used in the protocol.

According to an embodiment, chaincodes store data in a key value storage model. This key value storage is an always available storage as it represents the blockchain. The key value storage allows queries on partial keys. Thus, by simply prefixing every company's key with the keyword "company", all companies can then be queried. It is possible to prefix the customers the same way.

In Algorithm 3 shown in FIG. 6, two data structures used by the protocol are defined, namely the customer (referred to herein also as the user) and the company. The customers or users are defined by their ID, their Public key (Pk), and the commitment to their files. The ID can be a number derived from the public key (Pk) or can be assigned randomly. To prevent users to create more than one record on the blockchain, it is possible to either seed the private key using personal information such as the social security number and the name, or to use an identity provider which keeps record of the identity of all the users already registered and prevents users to register twice.

Figure 2:
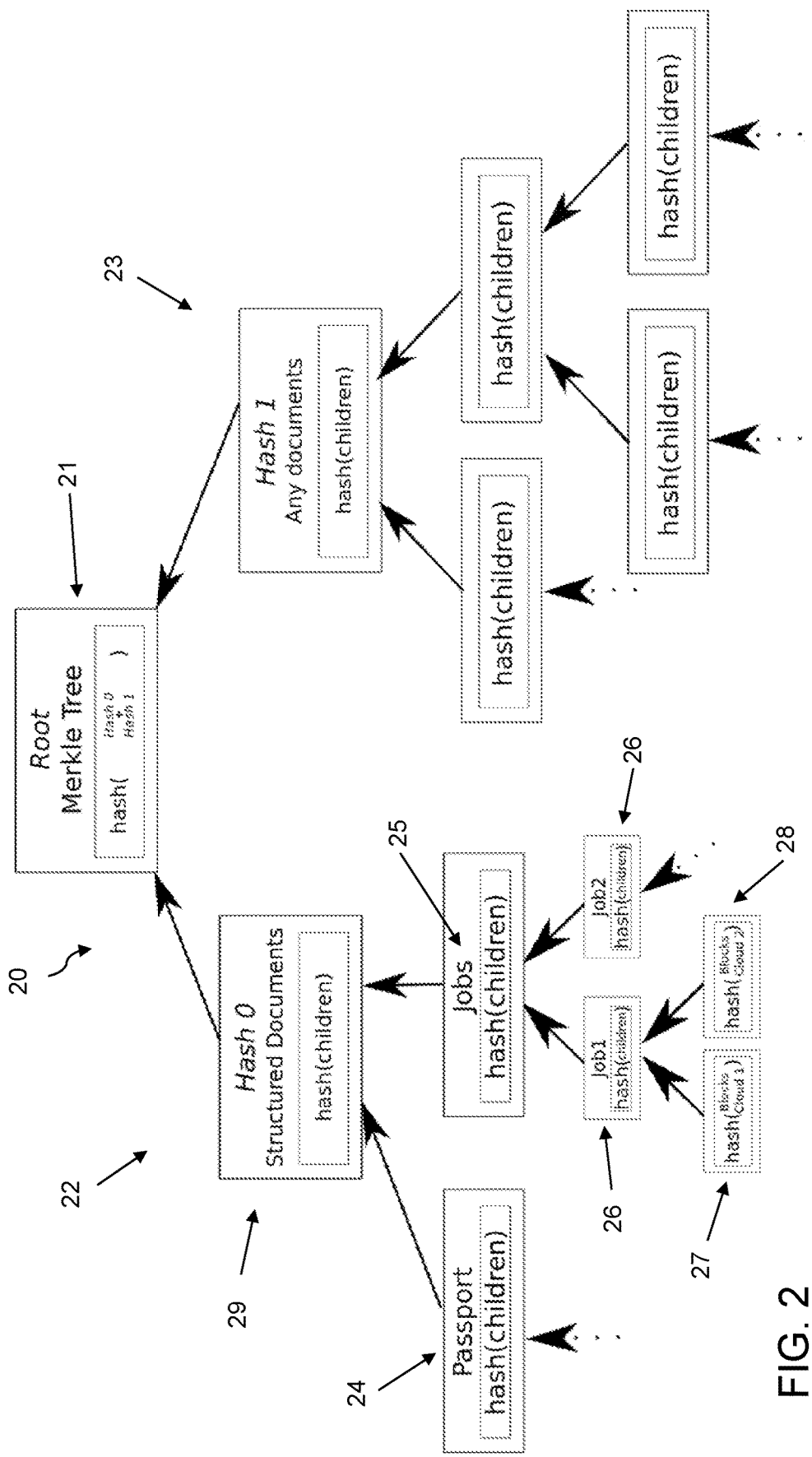
FIG. 2 is an example of a structured Merkle tree for a user having two jobs and using two different cloud providers.

To represent the commitment of the files of a user on the blockchain, an embodiment of the present invention uses a structured Merkle tree 20, as shown in FIG. 2. A Merkle tree allows an efficient and secure verification of the content of all the files. Using Merkle trees, it can be ensured that the files provided by the users are the ones committed and not some modified files. Imposing a structure on the Merkle tree allows companies to ensure that the user is not trying to equivocate some information about important documents, as one of the advantages of the Merkle tree is that the user can decide what part of it the user discloses.

According to an embodiment, the users upload their personal files to at least two different cloud services. To ensure privacy without any key management, the files are encrypted using Bastion. To discard the key, it is simply added at the end of the blocks right after the advanced encryption standard (AES) encryption, before the all or nothing transform (just before Line 6 in Algorithm 1). As Bastion is an AONE with $\lambda=2$, two blocks are uploaded on each cloud service, ensuring that to decrypt the file, one first has to access all the cloud services. This also means that if some cloud services have a data breach, the users' documents are safe as long as at least one cloud service has good security.

According to an embodiment, AONE, and not standard encryption, is used because standard encryption would require an overhead for the key management. As each file has to be encrypted using a different key, the management of the keys with the possibility to grant access to multiple companies as well as to update a file (and thus modify the encryption key) would require a complex key management scheme. Using AONEs, it is simply provided that multiple cloud services remove completely the necessity of a key management protocol. In a preferred embodiment, Bastion is used as the AONE as it achieves better performances than other AONE protocols.

In a usual Merkle tree, the leaves of the tree are the data files. In the present exemplary embodiment of the structured Merkle tree 20 shown in FIG. 2, the leaf nodes 27, 28 are the hashes of the encrypted blocks stored on each different cloud service providers' servers Cloud 1 and Cloud 2, and the non-leaf nodes 24, 25, 26, 29 representing the data files are the ones above all those blocks. In the present example, non-leaf node 24 represents the passport, as it is the node above all the passport leaf nodes, and it is the node required in order to be able to verify that the passport file is correct. In order to verify the non-leaf node 24, the non-leaf node 29 is used, and then the Merkle root 21 is used as only the Merkle root 21 is stored on the blockchain. Note that this is not the case of non-leaf node 25, as this is above two such nodes (job1 and job2 of non-leaf nodes 26). For example, in FIG. 2, the node 26 representing Job1 is the node that is above the node 27 representing the hash of the blocks of Job1 stored in a first cloud server Cloud 1 and the node 28 representing the hash of the blocks of Job1 stored in a second cloud server Cloud 2. Note that in the case where the user uses more than two cloud service providers, there can be more than one layer under Job1. There is also an unstructured part 23 that can represent a hash of any other possible documents. In this case, the root 21 of the Merkle tree 20 is a hash of the structured part 22 (Hash 0) and the hash of the unstructured part 23 (Hash 1). The structured part 22 is a hash of the branches below, which in the exemplary embodiment shown in FIG. 2, uses a passport 24 and jobs 25 (each represented by a hash of the children) of the user as the data files. The unstructured part 23 is determined in a same manner if other documents are to be used, for example, for the respective KYC process. The value of the Merkle root 21, as well as the values of the non-leaf nodes 24, 25, 26 representing the data files, is random due to the hashes being hashes of encrypted files and not plain text data files.

Because the hash of the encrypted file is used for the commitment, randomization on the value of the hash is ensured and brute force guesses on deterministic files are prevented as no information can be inferred from the value. An example of a guessing attack can be done on a proof of employment containing the salary of the employee. Indeed, companies most likely use templates and the only different value between two employees would be the name and the salary. As the salary only has a finite (and small) amount of possible value, a brute force attack would be effective to discover the salary of an employee only based on the hash of the document. As the output of the AONE using the AES encryption function inside is indistinguishable from a random under chosen plain text attack, one cannot infer any information based on the hash of the encrypted file. Accordingly, embodiments of the present invention enhance file security.

The company structure is the second structure defined in Algorithm 3 shown in FIG. 6. Companies are defined by, as the customers, their ID first, then their name and website's uniform resource locator (URL). The website's URL is used, as well as its certificate, to authenticate the company when it registers. Verification of the companies can be modified according to needs. Companies also add a Public key (Pk), and use it to authenticate themselves afterward in the protocol. The Endpoint_Contact is an URL that will be used by users to start an off-chain communication with the company.

Figure 3:
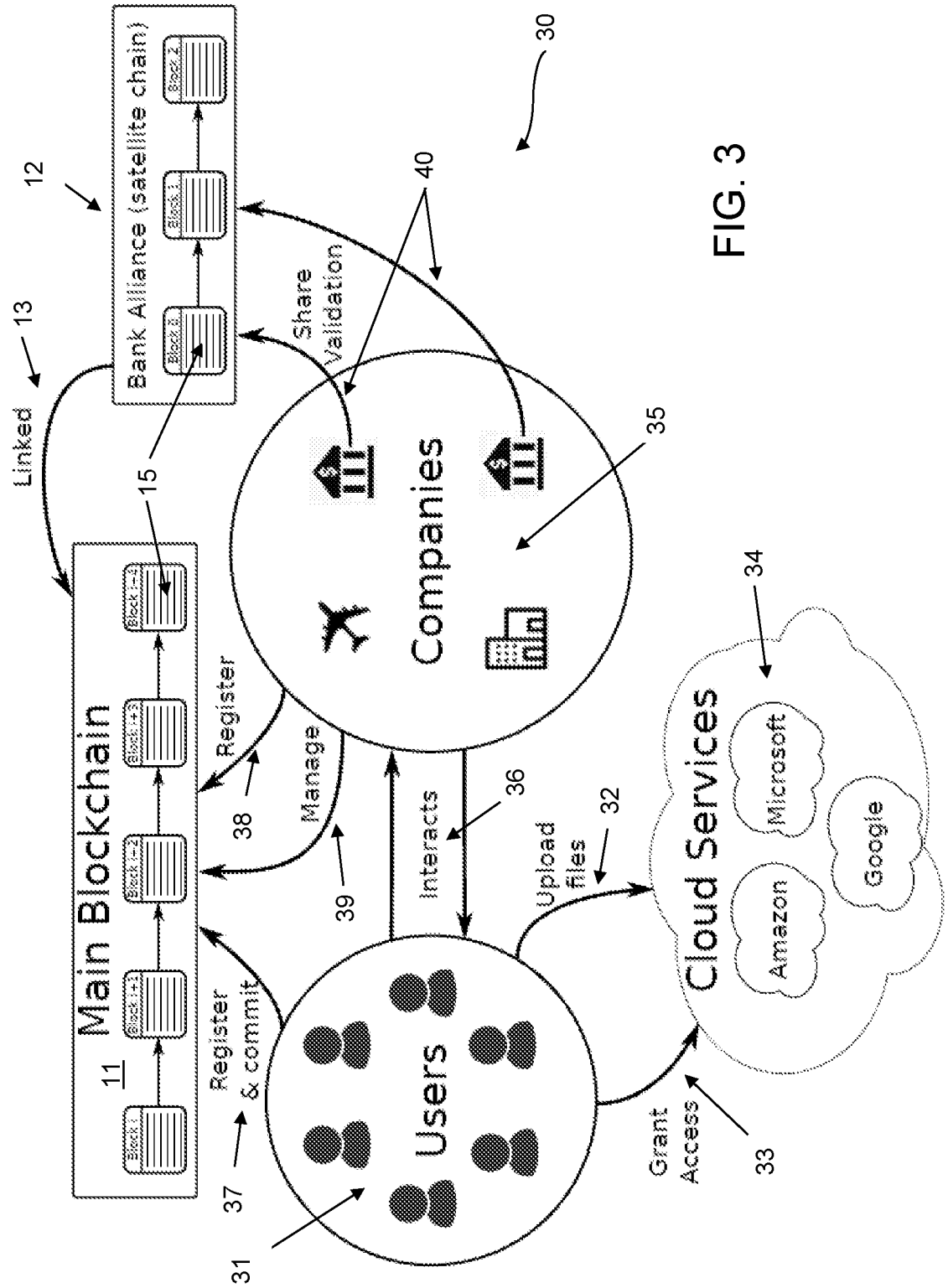
FIG. 3 is a schematic overview of a system showing different interactions of the protocol used in an embodiment of the present invention.

FIG. 3 shows schematically a system 30 in which the users 31 and companies 35 register with a main blockchain 11. In the protocol used in embodiments of the present invention, there are two main actors which engage in network interactions 36: the companies 35 and the customers (referred to here again as users 31), each of which have computing devices, such as smartphones, tablets, computers, servers or the like. The companies 35 operate as nodes on the blockchain (i.e., have a complete copy of the blockchain). As the blockchain is permissioned, only companies 35 are permitted to run a blockchain node. The users 31 are registered to the blockchain through public keys. The purpose of companies 35 is to optimize their KYC protocol by sharing validation data through issuing a validation transaction 40 without losing any insurance about the validity of the documents using a satellite chain 12 of an alliance of the companies 35. The purpose of the users 31 is to enter new contracts with companies 35. This protocol is based on the blockchain for sharing information between the companies 35 without relying on a trusted third party.

Users 31 that want to participate to the protocol perform a register and commit transaction 37 to the main blockchain 11. The users 31 upload files 32 or have already uploaded their files on different cloud services 34. The companies 35 act to manage 39 the main blockchain 11 and form alliances which are subsets of the companies 35, each of the alliances being assigned to its own satellite chain 12 having the link 13 to the main blockchain 11 as discussed in reference to FIG. 1.

To preserve the privacy of the users 31, the files are encrypted using a key-less encryption protocol. This is done preferably using an AONE protocol. The encryption protocol separates a file into multiple blocks as output of the AONE, which are then uploaded to the different cloud services 34. The key is uploaded alongside the file. To decrypt a file, one first has to access all the cloud services 34 to retrieve all the different blocks, and then apply the decryption protocol. Preferably Bastion is used as the AONE protocol. Once the files are uploaded on the cloud services, the users have to commit to the version of their files by storing a hash of their document on the blockchain through the register and commit transaction 37. In order to store only one hash, an embodiment uses the structured Merkle tree 20 depicted in FIG. 2, and stores its root 21. This commitment prevents the user to equivocate files to different companies.

Referring again to FIG. 3, the companies 35 also have to register 38 to the main blockchain 11. On the main blockchain 11, the companies 35 store several information, such as a way to contact them, as well as their identity and a proof of their identity (by using, for example, their web certificate). The companies 35 form alliances, in which they will formalize the document verification process by means of a chaincode. The companies 35 in an alliance trust the verification of the other members of the same alliance. The alliance is represented by the satellite chain 12, containing all the companies 35 part of the alliance and the chaincode formalizing the verification process is deployed on the alliance's satellite chain 12. When a company verifies a document, it then issues a transaction on the satellite chain 12 claiming that it validated the document. The transaction contains the hash of the encrypted document, as well as all the other information required by the chaincode for the document validation. Companies 35 can join more than one alliance.

When a user 31 wants to start a new contract with a company 35, the company 35 requests to the user 31 the documents required for the KYC process. To provide access to these documents, the user 31 modifies the ACL of the cloud services to grant the company 35 a read access. The user 31 then provides a list of URLs so the company 35 can retrieve the documents. The user 31 also provides the information required by the company to verify the Merkle tree. Once the company 35 has retrieved all the documents, it first verifies that the Merkle tree is valid and that its root is the same as the one stored on the main blockchain 11. Then, the company 35 can start the verification process. This process first begins with the company 35 searching the alliance's satellite chain 12 to find out whether some of the documents have already been verified or not. If this is the case, the company 35 can then skip the verification process of those documents, as they have already been verified by a trusted company. For all the other documents, the company has to verify them itself. Once the company 35 has verified a document that has not been verified on the alliance's ledger yet, the company 35 issues a transaction attesting the validation of the document using the hash of the encrypted document. Once all the documents have been validated, the company can issue the contract to the user. The contract is then stored on the cloud services the same way as all the other documents.

According to an embodiment, a user 31 registers to the protocol with at least the following steps:

1. Create a (public, secret) key pair that will be used to authenticate the user 31.

2. Upload each of their files on the cloud services 34 securely, for example, using Algorithm 4 shown in FIG. 7. The files are encrypted to prevent a curious cloud service to read the documents.

3. Create a record on the main blockchain 11 that will be used as a commitment of its files with this tuple (Public key, Root MerkleTree). This record is used to authenticate the user 31 using the public key contained in it. As the record is stored on the main blockchain 11, it is then used to authenticate the user 31 with the companies 35. The user 31 has to go through a company 35 to create the record as the main blockchain 11 is permissioned based.

According to an embodiment, a user 31 requests a new contract by at least the following steps:

1. Request a new contract with a company 35 registered on the main blockchain 11. To do this, an application running on the user's device contacts the company using the company's Endpoint_Contact that is stored in the company's record on the main blockchain 11. The main blockchain 11 provides a way to authenticate the companies 35 without relying on certificates, as companies 35 which have performed register transactions 38 to the main blockchain 11 have been verified.

2. Sign the terms of agreement provided by the company 35.

3. When the company 35 requests some files, the user's application performs:
   (a) Grant access 33 on each cloud service 34 to the company 35. This is done by contacting each cloud service 34 and modifying the ACL of each file to add read access to the company 35.
   (b) Send the URL of each file to the company 35 so that the company 35 can download the files, for example in accordance with Algorithm 5 shown in FIG. 8.
   (c) Provide the necessary information to validate the Merkle Tree. The company 35 will verify the computed root of the Merkle tree with the one stored on the main blockchain 11. If the value is the same, it ensures to the company 35 that the user 31 has not modified any document in a covert manner, and is not trying to equivocate important files. For example, referring now also to FIG. 2, if a user 31 wants to use only the passport, the user 31 provides hashes of the non-leaf node 25 and the unstructured part 23. Then, the company 35 can compute the structured part 22 as the hash of the passport (using the blocks retrieved from the respective URLs) plus the hash of the jobs (which was provided). Then, the root 21 can be computed by combining the hashes of the structured part 22 and the unstructured part 23 (which was provided). This advantageously allows the user 31 to select what documents to use, or to hide any other parts of the Merkle tree 20 while at the same time not revealing any information about the amount of his data files or their content.

4. If the files are all correct, and if the user 31 is eligible for the contract, the company 35 provides a contract to the user 31. The user 31 has to sign the contract send it back to the company 35 and store it by uploading it to the cloud services 34 using Algorithm 4 shown in FIG. 7, as for the private files.

In the following, the protocol according to an embodiment is described in greater detail, first describing the setup stage, and then describing the protocol when a user desires to start a new contract with a company, which thus has to verify the user's document. Each interaction is represented in FIG. 3.

In the setup stage, there is first provided a consortium of companies 35 that ensure the necessary roles of the main blockchain 11 are performed, such as endorsers and orderers which are expected to run the chaincodes and the consensus protocol respectively. Then, the companies 35 deploy the chaincode according to an embodiment of the invention that is used to interact with the main blockchain 11, such as the chaincode in Algorithm 6 shown in FIGS. 9A and 9B. In order to demonstrate some of the main features according to an embodiment, the algorithms have been simplified, and verification processes have been removed or simplified for readability purposes. This chaincode allows the companies 35 and the users 31 to create a record on the ledger and to update it if necessary. The main blockchain 11 therefore keeps track of registrations, as well as the commitments (hashes) from the users 31.

For company setup, companies 35 create a record on the ledger using the chaincode. This is done according to the function "add company" in Algorithm 6 (Line 1). To add itself to the blockchain, a company has to call this function with the structure "company" (see Algorithm 3 in FIG. 6) filled and use the private key of its web certificate to sign it. If the signature and the certificate are valid, the chaincode registers and adds the company to the ledger. The verification of the companies trying to join the network can be modified at any time, to fit the needs. Finally, the company has to create an account on all the major cloud services 34, that will be used by the users 31 to grant access 33 to their files.

Companies 35 create and join alliances. An alliance is represented by a satellite chain 12. Once the alliance is created, the companies will deploy chaincodes on the alliance's satellite chain 12 representing the logic of the verification process. Companies 35 are not restricted to one alliance.

When a company 35 does a full document verification, it can then issue a validation transaction 40 containing all the information needed, as well as the hash of the encrypted document, creating a record that this document has been validated. This transaction 40 is issued on the alliance satellite chain 12. The next time a company 35 in the alliance has to verify the same document, it will detect that the document has already been verified on the alliance satellite chain 12 and will then skip the verification step. A company 35 that validates a document on the satellite blockchain 12 is accountable for its verification.

For user setup, users 31 first gather their documents to upload 32 them on different cloud services 34. Users 31 register for a few different (at least two) cloud service providers 34 for the protocol to be secure. Each file f is then encrypted and uploaded to the group of cloud services according to Algorithm 4 shown in FIG. 7. Bastion is used to encrypt the files and, to remove the needs of key management while ensuring the privacy of the users 31, the key is uploaded alongside with the blocks of the file. As Bastion is a block cipher, it splits the file into n blocks. Then, if the number of clouds is equal to c, the protocol uploads $n_c = \max\{n/c, 2\}$ blocks on each cloud. If $n_c$ is not an integer, then $[n_c]+1$ blocks are uploaded on the $c*(n_c-[n_c])$ first clouds, and $[n_c]$ on the others.

At least two blocks are provided on each cloud because Bastion is AONE with $\lambda=2$ meaning that if an attacker recovers the encryption key and n −2 blocks, the attacker will not be able to recover any information about the plain text. This also mean that the cloud services cannot recover any information about the user using the blocks uploaded, as they would miss at least two blocks to decrypt the document. To obtain a sufficiently high number of blocks, padding may be added to the files. Using the protocol, the user 31 is not required to manage any key, as it is uploaded directly on the cloud servers along with the files.

Once the files are uploaded, the user 31 can then create a record on the ledger. The user 31 simply fills in the customer structure, self-signs it, and then queries the Add_Customer function in Algorithm 6 (Line 16). Because a permissioned blockchain is used, users 31 pass by a company 35 that is part of the consortium for every invocation of the chaincode.

When a user 31 wants to enter a new contract with a company 35, the following protocol takes place, according to an embodiment. It is assumed that the user 31 and the company 35 already did the setup step and both have a record on the ledger representing them. All the communication interactions 36 between the user 31 and the company 35 are done on a secure communication channel or network off the main blockchain 11. According to an embodiment, the following steps are performed.

1. The user 31 contacts the company 35 using its Endpoint_Contact.
2. The company 35 sends the user 31 the terms of agreement.
3. If the user 31 does not agree with the terms, the protocol aborts. Otherwise, the user 31 signs the agreement and sends it back.
4. The company 35 issues the list of required documents.
5. The user 31 grants access 33 to the company 35 on the files' ACL. Then, the user 31 sends the URL of each file to the company 35, as well as the information required to verify the Merkle tree as discussed above.
6. The company 35 verifies the Merkle tree. This is done by recomputing the root of the Merkle tree using the files and the information provided by the user 31, and then comparing this value with the one stored on the blockchain.
7. The company 35 starts the verification process, and performs the following for each file:
   (a) The company 35 first checks if the file has already been verified in one of the company's alliances. This is done by checking on the alliance satellite chain 12 if another company already issued a transaction containing the hash of the encrypted file claiming it has validated it. If the company 35 is part of multiple alliances, it has to check each satellite chain 12 independently.
      i. If the file has already been verified, the company 35 issues a transaction which will be included in a new block 15 on the alliance's satellite chain 12. This is done automatically by the company's node.
   (b) The company 35 can then try to retrieve the validation from another satellite chain. This can be done either by asking the user 31 if it has already entered a contract with another company that is part of another alliance that is trusted by the company 35, or the alliances can also have some contact endpoint where other companies can issue such request.
      i. If the company 35 finds another alliance that already has validated this file, it can then retrieve this validation. But, as the company is not part of the satellite chain of the other alliance that contains the validation, it can perform an asset transfer transaction 18 from the other satellite chain, as shown in FIG. 1 and explained above.
   (c) If the document has not been verified by anyone the company 35 trusts, then the company 35 has to verify it by itself, for example as in a typical KYC process. Once the document is verified, the company 35 should issue a transaction on its alliance's satellite chain 12 to share the verification.
8. Once the company 35 is convinced about the validity of the documents, either by its own verification or by using the verifications of other companies, the company 35 issues the contract to the user 31. The user 31 will then have the possibility to upload it securely on different cloud services 34 the same way as the other files. The file is then added in the "any documents" side of the unstructured part 23 of the Merkle tree 20 shown in FIG. 2.

For example, referring to FIGS. 2 and 3, a user 31 has only two documents or data files, one passport and one job Job1 (i.e., in this case without the other job2). When the user 31 registers to the main blockchain 11, the user 31 provides its public key and the root 21 of the Merkle tree 20 constructed using the passport and the job, as well as any other documents under the unstructured part 23. When a company 35 wants to validate a document, for example the passport of the user 31, the company 35 retrieves the blocks of the passport stored on the different cloud servers and thereby computes the hash of the passport as node 24. The user 31 sends the hashes of job1 as node 25 and the hash of any other documents as the unstructured part 23, which the company 35 can use to compute the root 21 of the Merkle tree 20, and compare it to the value stored on the main blockchain 11. The company 35 then searches its satellite blockchain 12 to determine if the value it has computed for the passport as node 24 is already present, meaning that the passport has already been verified by another trusted company in the alliance. This process advantageously assures that the user 31 will not be able to provide two different passports to two different companies 35.

In the following, it is demonstrated how the protocol according to embodiments of the present invention is secure according to a threat model.

The companies of the protocol were considered honest, but curious. It is shown that they cannot gain more knowledge than what they are supposed to for their KYC process. Companies cannot gain any knowledge about users using what is stored on the blockchain, as there is only a public key, and a hash of encrypted documents. When a user grants access to a company to certain files, the company cannot access more than those files, as the cloud services are assumed to be honest and to apply correctly their ACL. The company cannot also infer any information from the Merkle tree, as the user grants the minimal amount of information to the company in order to verify it. The other possible source of information can be the companies alliance's satellite chain. However, this satellite chain only contains information that companies of the alliance are willing to share, thus it is not able to learn anything more than what it is allowed to.

The cloud services were considered as honest, but curious. If the cloud services correctly enforce their ACL, then it can be shown that they cannot gain any knowledge about the data of their clients. Bastion divides a file into n blocks, and as long as someone cannot retrieve at least n−2 blocks and the key, it is proven that all information cannot be extracted from those blocks. The protocol to store documents require at least two different clouds to store at least two blocks on each of them. This means that as long as at least two of the clouds apply their ACL correctly, then none of the clouds can infer any information about the content of the stored documents.

If some clouds are not considered trustfully, the user can either not use them, or use a higher number of different clouds.

To show that the system is secure against a rational user, it is shown that, whatever the user tries to do, the user cannot equivocate by showing documents to different companies and the user cannot learn anything about other users.

First, the user always has to show the same Merkle root, because if the user shows a different Merkle root than the one stored on the blockchain, then the protocol will detect it and abort. Thus, if the user wants to equivocate, the user has to display a different part of the tree to each company. While this can work for some documents considered as not important, this is completely prevented for each of the important documents, as they are represented in a structured Merkle tree. For example, using the structured Merkle tree 20 in FIG. 2, if the user tries to say "my passport is in Root-+Any Documents-+Passport", the company will refuse it, as the path of the passport should always be: Root-+Structured Documents-+Passport. The user cannot even create two different passports under the "structured documents" node (see FIG. 2), as the passport is always the leftmost child. Thus, by enforcing a structure on the Merkle tree, users cannot equivocate important information to companies.

As for the companies, users cannot learn anything about other users by scanning the blockchain, as none of the information stored on it can be used to retrieve information about the data it represents.

Accordingly, the protocol is secured with respect to all parties' computing devices and can reduce the cost induced by KYC, as well as reduce the overhead caused by the verification of documents already verified. Moreover, computational resources are saved and used more efficiently. Without the protocol, companies could mainly share information only to other companies it trusts. Without the blockchain to ensure the accountability of each transaction and validation, companies really would need to trust each other and not simply rely on liability agreements.

Because the protocol is based on blockchain technology for the sharing of information, companies are accountable for the validation they provide. The protocol also allows the sharing between companies that only agree on the KYC process, and trust is not necessary. Embodiments of the present invention thus provide a protocol for fair sharing of validation data with accountability toward the validating company. Embodiments of the present invention also provide a way for users to securely and in a privacy preserving manner share their files to the companies in a key-less protocol. The protocol also prevents user to equivocate information to different companies, allowing a fast verification of documents.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for securely sharing validation information of one or more data files stored on different cloud servers using distributed ledger technology, the method comprising:
   a) requesting access to the data files stored on the cloud servers;
   b) calculating a hash of the data files;
   c) constructing a structured Merkle tree using the hash of the data files and additional hashes received from a user, the additional hashes being hashes of other data files for which the user has not granted access, but has used to construct a corresponding Merkle tree for which the user has committed a root value to a main blockchain to which the user has registered;
   d) checking whether the root value of the Merkle tree constructed in step c) is the same as the one the user has committed to the main blockchain; and
   e) checking whether the hash of the data files is stored in a block of a satellite blockchain linked to the main blockchain and operated by a subset of nodes of the main blockchain that trust one another,
   wherein, based on a determination in step e) that the hash of the data files is already stored in the satellite blockchain, the data files are validated without undergoing any other validation process.

2. The method according to claim 1, wherein the data files have an all or nothing encryption.

3. The method according to claim 1, wherein the data files are requested by a company registered to the blockchains to secure a Know Your Customer (KYC) process in response to a request from the user to enter into a contract with the company, the method further comprising issuing the contract.

4. The method according to claim 1, wherein the request to access the data files triggers a request from the user to different cloud service providers of the cloud servers to modify an Access Control List (ACL).

5. The method according to claim 1, further comprising issuing a transaction in a new block on the satellite blockchain including the hash of the data files indicating that a shared validation has been used.

6. The method according to claim 1, further comprising, based on a determination in step e) that the hash of the data files is not already stored in the satellite blockchain:
   determining whether the hash of the data files is stored in a different satellite chain linked to the main blockchain; and
   requesting an asset transfer transaction from the different satellite chain to validate the data files.

7. The method according to claim 1, further comprising, based on a determination in step e) that the hash of the data files is not already stored in the satellite blockchain:
   performing a separate validation process; and then
   issuing a transaction in a new block on the satellite blockchain including the hash of the data files.

8. The method according to claim 1, wherein, in response to step a), uniform resource locators (URLs) to blocks of the data files on the cloud servers are received and used to download the data files for performing step b).

9. The method according to claim 8, wherein a public key of the user stored on the main blockchain is used for calculating the hash of the data files in step b).

10. A computer system for validating data files stored on different cloud servers using distributed ledger technology, the system comprising one or more computational hardware processors with access to memory, which, alone or in combination, are configured to provide for execution of the following steps:

a) requesting access to the data files stored on the cloud servers;
b) calculating a hash of the data files;
c) constructing a structured Merkle tree using the hash of the data files and additional hashes received from a user, the additional hashes being hashes of other data files for which the user has not granted access, but has used to construct a corresponding Merkle tree for which the user has committed a root value to a main blockchain to which the user has registered;
d) checking whether the root value of the Merkle tree constructed in step c) is the same as the one the user has committed to the main blockchain; and
e) checking whether the hash of the data files is stored in a block of a satellite blockchain linked to the main blockchain and operated by a subset of nodes of the main blockchain that trust one another,
wherein, based on a determination in step e) that the hash of the data files is already stored in the satellite blockchain, the computer system is configured to provide a notification that the data files have been validated without a need to perform any other validation process.

11. The computer system according to claim 10, wherein the data files have an all or nothing encryption.

12. The computer system according to claim 10, wherein the data files are requested by a company registered to the blockchain to secure a Know Your Customer (KYC) process in response to a request from the user to enter into a contract with the company.

13. A non-transitory, tangible computer-readable medium having instructions thereon which, upon execution on one or more processors, provide for execution of the following steps:

a) requesting access to the data files stored on the cloud servers;
b) calculating a hash of the data files;
c) constructing a structured Merkle tree using the hash of the data files and additional hashes received from a user, the additional hashes being hashes of other data files for which the user has not granted access, but has used to construct a corresponding Merkle tree for which the user has committed a root value to a main blockchain to which the user has registered;
d) checking whether the root value of the Merkle tree constructed in step c) is the same as the one the user has committed to the main blockchain; and
e) checking whether the hash of the data files is stored in a block of a satellite blockchain linked to the main blockchain and operated by a subset of nodes of the main blockchain that trust one another,
wherein, based on a determination in step e) that the hash of the data files is already stored in the satellite blockchain, the data files are validated without undergoing any other validation process.

14. A method for securely sharing validation information of one or more data files stored on different cloud servers using distributed ledger technology, the method comprising:

a) requesting access to the data files stored on the cloud servers;
b) calculating a hash of the data files;
c) constructing a structured Merkle tree using the hash of the data files and additional hashes received from a user, the additional hashes being hashes of other data files for which the user has not granted access, but has used to construct a corresponding Merkle tree for which the user has committed a root value to a main blockchain to which the user has registered;
d) checking whether the root value of the Merkle tree constructed in step c) is the same as the one the user has committed to the main blockchain; and
e) checking whether the hash of the data files is stored in a block of a satellite blockchain linked to the main blockchain and operated by a subset of nodes of the main blockchain that trust one another,
wherein, based on a determination in step e) that the hash of the data files is not already stored in the satellite blockchain, the following steps are performed:
determining whether the hash of the data files is stored in a different satellite chain linked to the main blockchain; and
requesting an asset transfer transaction from the different satellite chain to validate the data files.

15. The method according to claim 14, wherein the data files have an all or nothing encryption.

16. The method according to claim 14, wherein the data files are requested by a company registered to the blockchains to secure a Know Your Customer (KYC) process in response to a request from the user to enter into a contract with the company, the method further comprising issuing the contract.

17. The method according to claim 14, wherein the request to access the data files triggers a request from the user to different cloud service providers of the cloud servers to modify an Access Control List (ACL).

18. A method for securely sharing validation information of one or more data files stored on different cloud servers using distributed ledger technology, the method comprising:

a) requesting access to the data files stored on the cloud servers;
b) calculating a hash of the data files;
c) constructing a structured Merkle tree using the hash of the data files and additional hashes received from a user, the additional hashes being hashes of other data files for which the user has not granted access, but has used to construct a corresponding Merkle tree for which the user has committed a root value to a main blockchain to which the user has registered;
d) checking whether the root value of the Merkle tree constructed in step c) is the same as the one the user has committed to the main blockchain; and
e) checking whether the hash of the data files is stored in a block of a satellite blockchain linked to the main blockchain and operated by a subset of nodes of the main blockchain
wherein, based on a determination in step e) that the hash of the data files is not already stored in the satellite blockchain, the following steps are performed:
performing a separate validation process; and then issuing a transaction in a new block on the satellite blockchain including the hash of the data files.

19. The method according to claim 18, wherein the data files have an all or nothing encryption.

20. The method according to claim 18, wherein the data files are requested by a company registered to the blockchains to secure a Know Your Customer (KYC) process in response to a request from the user to enter into a contract with the company, the method further comprising issuing the contract.

* * * * *